United States Patent
Stenstrom et al.

(10) Patent No.: US 7,206,583 B2
(45) Date of Patent: Apr. 17, 2007

(54) CO-CHANNEL INTERFERENCE SUPPRESSION BY ESTIMATING THE TIME OF ARRIVAL (TOA)

(75) Inventors: Niklas Stenstrom, Helsingborg (SE); Bengt Lindoff, Bjarred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 10/477,410

(22) PCT Filed: Apr. 22, 2002

(86) PCT No.: PCT/EP02/04505

§ 371 (c)(1),
(2), (4) Date: Jun. 1, 2004

(87) PCT Pub. No.: WO02/093965

PCT Pub. Date: Nov. 21, 2002

(65) Prior Publication Data

US 2004/0214578 A1    Oct. 28, 2004

Related U.S. Application Data

(60) Provisional application No. 60/291,600, filed on May 17, 2001.

(30) Foreign Application Priority Data

May 15, 2001    (EP)    ................... 01610049

(51) Int. Cl.
*H04Q 7/20*    (2006.01)
(52) U.S. Cl. .............. 455/446; 455/447; 455/501; 375/341; 375/347; 375/144
(58) Field of Classification Search ............... 455/446, 455/447, 501; 375/341, 144, 347
See application file for complete search history.

(56) References Cited

U.S. PATENT DOCUMENTS 5,251,233 A  * 10/1993 Labedz et al. .............. 375/230

(Continued)

FOREIGN PATENT DOCUMENTS

EP    0952711 A    10/1999

(Continued)

OTHER PUBLICATIONS

H. Murata et al.: "Maximum-Likelihood Sequence Estimation for Coded Modulation in Presence of Co-Channel Interference and Intersymbol Interference", 1996 IEEE 46th Vehicular Technology Conference, IEEE, New York, USA, 1996, 3rd vol xxxix+1887 pp. 701-705 vol. 2.

(Continued)

*Primary Examiner*—Joseph Feild
*Assistant Examiner*—Pierre-Louis Desir
(74) *Attorney, Agent, or Firm*—Potomac Patent Group PLLC

(57) ABSTRACT

The invention provides improved suppression of co-channel interference (CCI) in a wireless cellular communications system where at least two base stations use the same transmit frequency. The method according to the invention uses the difference in synchronization times between the home signal and the CCI signal to suppress the CCI signal. The method uses a modified known method of estimating time of arrival (TOA) to estimate sync positions for the CCI signal. This enables the use of interference cancelling methods in communications systems using un-synchronized base stations. Receiver performance is improved, which in turn improves data throughput and received speech quality, since interfering signals from base stations using the same frequency can be suppressed.

6 Claims, 2 Drawing Sheets

U.S. PATENT DOCUMENTS

| | | | |
|---|---|---|---|
| 5,260,968 A * | 11/1993 | Gardner et al. | 375/347 |
| 5,317,323 A | 5/1994 | Kennedy et al. | |
| 5,507,034 A * | 4/1996 | Bodin et al. | 455/452.2 |
| 5,515,378 A | 5/1996 | Roy, III et al. | |
| 5,933,768 A | 8/1999 | Skold et al. | |
| 6,141,335 A * | 10/2000 | Kuwahara et al. | 370/342 |
| 6,473,619 B1 * | 10/2002 | Kong et al. | 455/456.1 |
| 2002/0058513 A1 * | 5/2002 | Klein et al. | 455/447 |

FOREIGN PATENT DOCUMENTS

| | | | |
|---|---|---|---|
| WO | WO96/11533 A | 4/1996 | |
| WO | WO98/59443 | 12/1998 | |
| WO | WO00/13383 A | 3/2000 | |
| WO | WO 200013383 A1 * | 3/2000 | |

OTHER PUBLICATIONS

A. Nilsson-Stig et al.: "Equalization of Co-Channel Interference in Future Mobile Communication Systems", Master thesis, Lund Institute of Technology, Sweden, 1999.

* cited by examiner

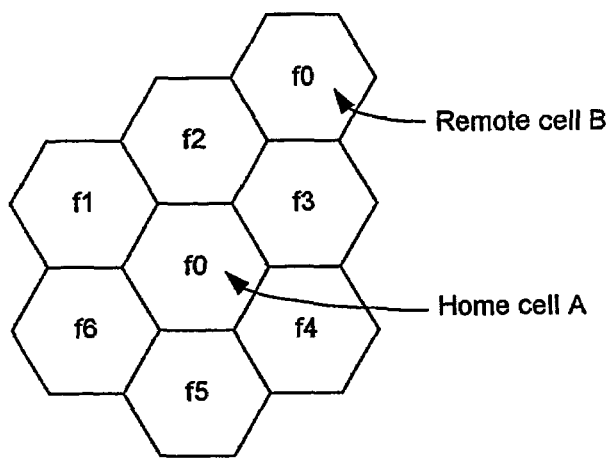
Fig. 1
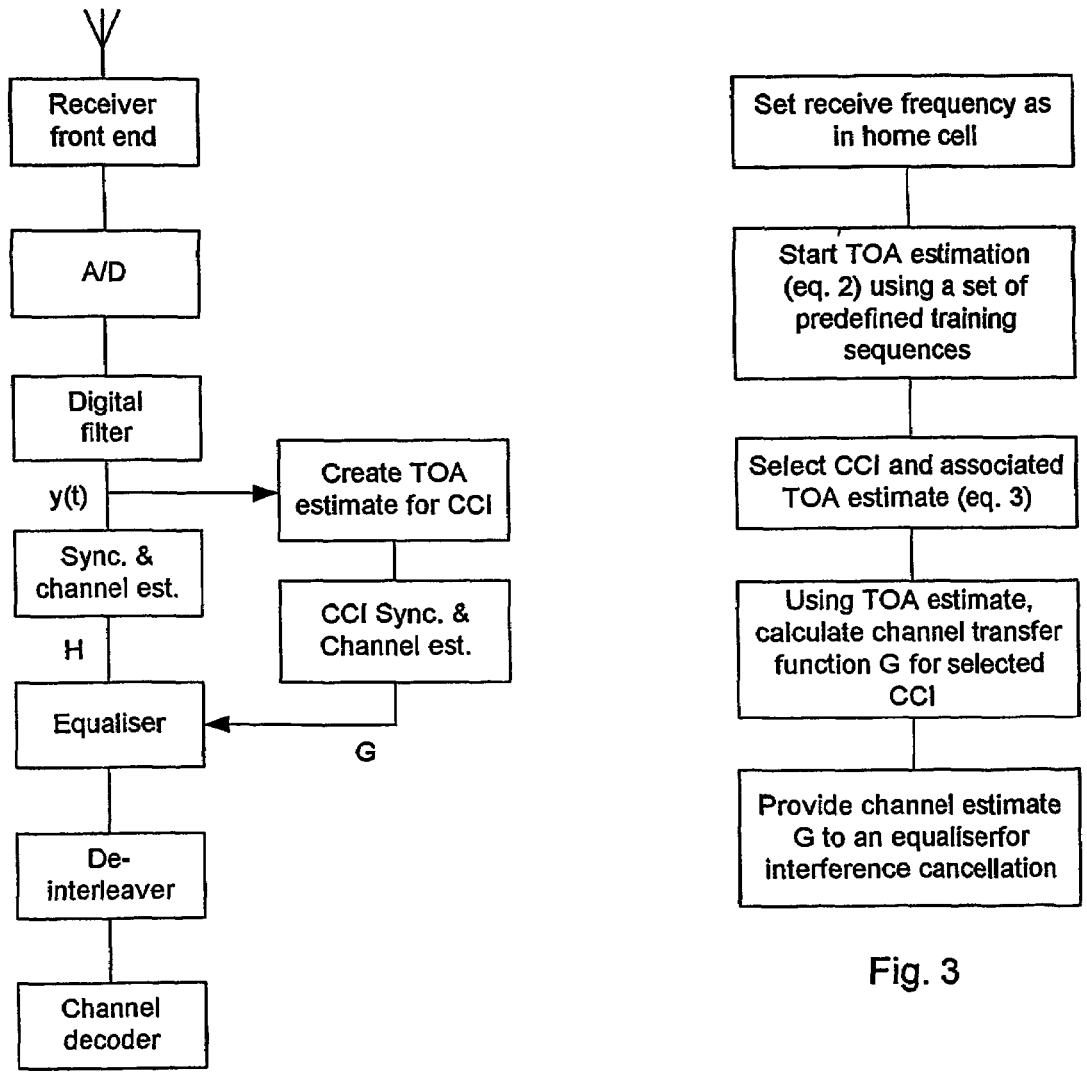
Fig. 2
Fig. 3

CO-CHANNEL INTERFERENCE SUPPRESSION BY ESTIMATING THE TIME OF ARRIVAL (TOA)

CROSS REFERENCE TO RELATED APPLICATIONS

This application claims the benefit of U.S. Provisional Application No. 60/291,600 filed May 17, 2001. This application also claims the benefit of European Application No. 01610049.7, filed May 15, 2001.

TECHNICAL FIELD OF THE INVENTION

This invention relates to a method and a system for cancelling or suppressing co-channel interference (CCI) in a wireless cellular communications system including at least two base stations using the same frequency, and to a mobile radio station such as a mobile communications device or a mobile telephone for use in such a communications system. The invention will be useful in TDMA and FDMA systems such as GSM and IS-136.

TECHNICAL BACKGROUND

In cellular wireless communications systems each base station covers a geographical area called a cell. Neighbouring cells usually use different frequencies. Frequencies can be reused in different cells, and cells using the same frequency are usually separated geographically by at least one intermediate cell using a different frequency. A mobile telephone or other mobile communications device in one cell, called the home cell, will normally be served by the base station, called the home base station, in the home cell. For two cells using the same frequency their mutual geographical distance may not always give sufficient attenuation of their signals to ensure that their signals do not interfere with each other, especially for hot spot areas, where frequencies need to be re-used for capacity reasons. Consequently, it may happen that, at some locations in the home cell, the mobile telephone can receive signals from a remote base station in a remote cell using the same frequency. The remote base station handles information or traffic, which is unrelated to the information or traffic handled by the home base station. When signals from two unrelated base stations using the same frequency are received by a mobile telephone, the signals from the remote base station may disturb or interfere with the signals received from the home base station. This is an undesired phenomenon called co-channel interference (CCI), and the remote base station is called a co-channel interferer.

It is the object of the invention to cancel or suppress co-channel interference.

U.S. Pat. No. 5,515,378 discloses a method and an apparatus for increasing the capacity and the quality of communication between remote users and a base station. Co-channel interference is suppressed by using a directive transmitter antenna array directed to individual mobile stations.

WO 98/59443 discloses a method and a system in which co-channel base station are provided with a time reference signal being a synchronizing signal or a time reference from another co-channel radio base station.

U.S. Pat. No. 5,317,323 discloses a system for accurately locating a mobile station using the Global Positioning System (GPS).

In general, in the state of the art systems for interference suppression, co-channel interferers are demodulated and interference symbols are subtracted from the received symbols. Co-channel interferers can be demodulated in several known ways. After the interference symbols have been subtracted from the received symbols, the remaining symbols are demodulated to extract the useful information from each burst or unit of transmitted signal.

PROBLEM TO BE SOLVED BY THE INVENTION

None of the known solutions are fully feasible in a communications system using un-synchronised base stations, or in a system where the relative timing of the co-channel interferers is unknown. This is crucial to interference suppression efficiency. If this information is missing an extensive search for the pilot symbols or training sequences has to be carried out, which is a complex and power consuming operation. It is therefore the object of the invention to provide a more efficient method of co-channel interference suppression.

SUMMARY OF THE INVENTION

The invention provides improved suppression of co-channel interference in a wireless cellular communications system where at least two base stations use the same transmit frequency. Co-channel interference suppression requires knowledge of the desired channel, ie the transmissions from the home base station, and of the interfering co-channel for the co-channel interference suppression to be efficient. The mobile station knows the characteristics of the home channel, but in most cases the interfering co-channel is unknown, and its characteristics will therefore have to be estimated. Relevant transmission channel characteristics include in particular the channel impulse response and the relative time difference between the desired signal from the home base station and the signal from the interfering co-channel. According to the invention the relative time difference between the desired signal and the signal from the interfering co-channel is estimated by finding their synchronisation (short: sync.) positions, which is advantageously done by estimating their times of arrival, TOA.

The method according to the invention uses a modified known method of estimating time of arrival (TOA), which is already used for positioning, to estimate channel characteristics, in particular impulse response and sync. position. This enables the use of interference cancelling methods in communications systems using un-synchronised base stations. Receiver performance is improved, which in turn improves data throughput and received speech quality, since interfering signals from base stations using the same frequency can be suppressed. Alternatively, the capacity of the system can be increased by higher frequency reuse without sacrificing data throughput or speech quality.

BRIEF DESCRIPTION OF THE DRAWINGS

FIG. 1 shows the cell structure of a FDMA wireless communications system,

FIG. 2 is a schematical block diagram of a digital receiver using TOA assisted interference suppression, FIG. 3 is a schematical flow chart showing the steps of interference suppression in accordance with the invention.

DETAILED DESCRIPTION OF THE INVENTION

Figure 4:
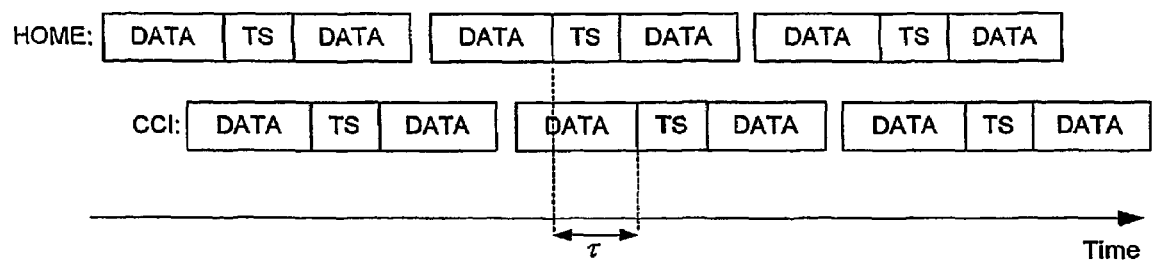
FIG. 4 shows schematically the relative timing of a received desired signal and a received interfering signal.

FIG. 1 shows a home cell A in which the home base station uses the frequency $f_0$. A number of neighbouring cells (in this case six are shown) cover the geographical area around the home cell A, and the base stations in neighbouring cells use different frequencies $f_1$ to $f_6$, all of which in particular are also different from the frequency $f_0$ used in the home cell A. Further away from the home cell A and beyond the surrounding neighbouring cells is a remote cell B in which the remote base station uses the same frequency $f_0$ as is used in the home cell A. This is called frequency reuse. The remote base station in the remote cell B may thus cause co-channel interference to mobile stations in the home cell A.

Transmitted data are divided into bursts or short packets of data. Each burst includes a training sequence, which is a predefined sequence of bits occupying a predefined position in each burst. In the receiver the training sequence will be recognised as such and will be used as a synchronising signal identifying eg the start and stop positions of each burst. Base stations using the same transmit frequency use different training sequences. In addition to using different transmission frequencies neighbouring base stations may also use different training sequences.

FIG. 4 shows a received desired signal from the home base station and a received interfering signal CCI from a remote base station. Each signal consists of a series of bursts, where each burst contains two data sequences with a training sequence TS between the two data sequences. The time difference between the two signals is indicated as the time interval $\tau$ between the start of their respective training sequences.

The impulse response is the received signal that would result from a short impulse being transmitted from the transmitter. In practice several reflected signals will be received in addition to a direct line-of-sight signal, which is known as multi-path transmission. In a multi-path environment the impulse response will therefore have several "peaks" separated in time and with different amplitudes corresponding to the direct signal and several reflected signals being received with different delays. In particular, estimates of the impulse response and sync. position or timing of the co-channel are required.

In a communications system where the receive or downlink frequency is reused in two or more cells the frequency reuse may introduce interfering signals or noise in the serving cell or home cell from the remote base station in a neighbouring or remote cell using the same frequency. As a result the signals received by the mobile station in the home cell will contain information from other base stations as well as noise. With one co-channel interferer the received signal y(t) can be expressed mathematically as follows:

$$y(t) = \sum_{k=0}^{L} h_k u_{t-k} + \sum_{k=0}^{L} g_k v_{t-k} + e(t) = H^T U_t + G^T V_t + e_t \quad (1)$$

where $H^T = [h_0, \ldots, h_L]^T$ is a complex-valued vector representing the radio channel of the home cell, $U_t = [u_t, \ldots, u_{t-L}]^T$ is a complex-valued vector representing the transmitted symbols in the home cell, $G^T = [g_0, \ldots, g_L]^T$ is a complex-valued vector representing the radio channel for the CCI, $V_t = [v_t, \ldots, v_{t-L}]^T$ is a complex-valued vector representing the transmitted symbols of the CCI, and $e_t$ is noise, which is often assumed to be white noise.

For the purpose of determining the geographical position of a mobile station it is known to determine the time of arrival (TOA) of signals received at the mobile station. In such methods the mobile station receives information from neighbouring base stations especially suitable for determination of position. In practice, and for capacity reasons, the TOA estimates are made for neighbouring base stations that use adjacent frequencies.

Co-channel interference suppression requires knowledge of the desired channel, ie the transmissions from the home base station, and of the interfering co-channel for the co-channel interference suppression to be efficient. The mobile station knows the characteristics of the home channel, but in most cases the interfering co-channel is unknown, and its characteristics will therefore have to be estimated. Relevant transmission channel characteristics include in particular the channel impulse response and the relative time difference between the desired signal from the home base station and the signal from the interfering co-channel. According to the invention the relative time difference between the desired signal and the signal from the interfering co-channel is estimated by finding their sync. positions, which is advantageously done by estimating their times of arrival, TOA.

Estimating time of arrival (TOA) can eg be carried out as follows. Given a specific training sequence, collect estimates of channel characteristics for the current and previously received bursts, $H_{vector} = [H_t, H_{t+1}, \ldots, H_{t+N}]$, where each $H_k$ is the channel estimate for burst k and consists of complex-valued channel taps $H_k = [h_{k,0}, h_{k,1}, \ldots, h_{k,L}]$. For each tap $|\overline{H}|^2$ is calculated:

$$|\overline{H}|^2 = \left[ \sum_{i=0}^{N} |H_{i,0}|^2, \sum_{i=0}^{N} |H_{i,1}|^2, \ldots, \sum_{i=0}^{N} |H_{i,L}|^2 \right] \quad (2)$$

$$= \left[ |\overline{H}_0|^2, |\overline{H}_1|^2, \ldots, |\overline{H}_L|^2 \right]$$

The TOA estimate is used as an estimate of the sync. position, and is calculated as the position, i, for which the energy $$E = |\overline{H}_i|^2; \; i \in [0, L] \quad (3)$$

is maximised. The references [1] and [2] give more details on this.

The timing of a co-channel interferer can be obtained by modifying the above method used in TOA measurements. Originally, TOA measurements were used for positioning purposes and for estimating the synchronisation position for a list of base stations, whose signals and related training sequences are received by the mobile station. For each base station in the list a TOA estimate, ie an estimate of the timing of the base station, is made. Together with geographical information the TOA is then used to calculate the position of the mobile station relative to the base stations. The list of base stations is selected such that the TOA estimates will produce a reliable result in terms of positioning performance. In a typical operation scenario the list includes neighbouring base stations using other frequencies than the base station home in the home cell.

The desired signal A from the home base station is usually much stronger than the interfering signal from the co-channel. The sync. position of the desired signal is therefore calculated or estimated using only a short time correlation, typically only over one burst. For this purpose known standard correlation methods can be used.

Due mainly to the distance from the remote base station the interfering signal from the co-channel is usually a weak signal. In order to obtain a proper estimate of the timing of the interfering signal it is therefore necessary to use a longer time correlation, usually over many bursts. This is used in the invention FIGS. 2 and 3 illustrate the invention. According to the invention a TOA calculation is switched on, performed during normal reception, and used for estimating the timing and sync. position of the co-channel interfering base station. In cases where the training sequence of the worst co-channel interferer is unknown, the average channel impulse response according to equation (2) above has to be carried out for each of the training sequences used by the co-channel interferer. Selection of a TOA estimate τ and which training sequence to use is then made jointly according to the criterion in equation (3) above.

When accurate timing information of the co-channel interferer is thus obtained the timing information is fed to a Sync. and Channel estimation unit that uses the timing information to calculate the current channel impulse response for the CCI. This information is then used in an equaliser for interference suppression that removes or suppresses the CCI signals.

In case of lack of information on the CCI training sequence, which is provided by the network, a search over all possible pilot sequences will have to be carried out.

REFERENCES

[1] H. Murata, S. Yoshida: *Maximum-Likelihood Sequence Estimation for Coded Modulation in Presence of Co-Channel Interference and Intersymbol Interference*, 1996 IEEE 46th Vehicular Technology Conference, IEEE, New York, USA, 1996, 3rd vol xxxix+1887 pp 701–705 vol. 2.

[2] A. Nilsson-Stig, H. Perbeck: *Equalization of Co-Channel Interference in Future Mobile Communication Systems*. Master thesis, Lund Institute of Technology, Sweden, 1999.

The invention claimed is:

1. A method of suppressing co-channel interference in a mobile station when used in a wireless cellular communications system including at least a home base station and a remote base station both using the same transmit frequency, the method comprising the following steps:

receiving a signal transmitted from the home base station, setting a receive frequency of the mobile station to the transmit frequency of the home base station, and, if a signal from a remote base station is received, performing the following steps:

determining a synchronisation time for the received signal from the home base station, determining a synchronisation time for the received signal from the remote base station, determining the time difference between the synchronisation time for the received signal from the home base station and the synchronisation time for the received signal from the remote base station, and using the time difference in a process suppressing the received signal from the remote base station, wherein the process suppressing the received signal from the remote base station is performed by the mobile station, wherein:

the synchronisation times for the received signals are determined by estimating their respective times of arrival at the mobile station;

the synchronisation time for the received signal from the home base station is determined using a short-term correlation over the signal from the home base station; and the synchronisation time for the received signal from the remote base station is determined using a long-term correlation over the signal from the remote base station.

2. A method according to claim 1 wherein the estimation of time of arrival involves detecting predefined known training sequences of data in the signal from the home base station.

3. A method according to claim 1 wherein the estimation of time of arrival involves detecting predefined known training sequences of data in the signal from the remote base station.

4. A mobile station for use in a wireless cellular communications system including at least two base stations using the same frequency, the mobile station comprising means for performing:

receiving a signal transmitted from the home base station, setting a receive frequency of the mobile station to the transmit frequency of the home base station, and, if a signal from a remote base station is received, performing the following steps:

determining a synchronisation time for the received signal from the home base station, determining a synchronisation time for the received signal from the remote base station, determining the time difference between the synchronisation time for the received signal from the home base station and the synchronisation time for the received signal from the remote base station, and using the time difference in a process suppressing the received signal from the remote base station, wherein the process suppressing the received signal from the remote base station is performed by the mobile station, wherein:

the synchronisation times for the received signals are determined by estimating their respective times of arrival at the mobile station;

the synchronisation time for the received signal from the home base station is determined using a short-term correlation over the signal from the home base station; and the synchronisation time for the received signal from the remote base station is determined using a long-term correlation over the signal from the remote base station.

5. A mobile station according to claim 4 wherein the estimation of time of arrival involves detecting predefined known training sequences of data in the signal from the home base station.

6. A mobile station according to claim 4 wherein the estimation of time of arrival involves detecting predefined known training sequences of data in the signal from the remote base station.

* * * * *